United States Patent Office 2,913,448
Patented Nov. 17, 1959

2,913,448

TREATMENT OF POLYMERS

Donald C. Tabler, Bartlesville, Okla., assignor to Phillips Petroleum Company, a corporation of Delaware No Drawing. Application May 25, 1956
Serial No. 587,217

11 Claims. (Cl. 260—94.9)

This invention relates to the treatment of polymers to modify the properties thereof. In one aspect it relates to a process for the treatment of certain polymers to modify certain of their properties. In other aspects it relates to the product of such a treatment.

Numerous methods for the polymerization of unsaturated hydrocarbons are known in the art. It is further known to polymerize olefinic hydrocarbons to obtain normally solid thermoplastic polymers.

An object of this invention is to provide derivatives of solid polymers which have modified properties.

Another object is to alter and improve certain of the properties of olefin polymers.

A further object is to increase the hardness of solid polyethylene.

A further object is to increase the strength of the solid polyethylene.

Other objects and advantages will be apparent to those skilled in the art upon inspection of this disclosure.

According to this invention, a normally solid polymer of an olefin is treated with at least one compound selected from the group consisting of urea and thiourea.

The polymers to which this invention is applicable include normally solid polymers of olefinic hydrocarbons, especially 1-olefins, and more especially 1-olefins having from two to eight carbon atoms per molecule and no branching nearer the double bond than the 4-position. These olefins include ethylene, propylene, 1-butene, 1-pentene, 1-hexene, 4-methyl-1-pentene, 1,3-butadiene, 1,3-pentadiene and isoprene. Copolymers, e.g. of ethylene and propylene and of ethylene and butadiene, are also within the scope of the invention. The invention is particularly applicable to normally solid polyethylenes. A particular class of polymers to which the invention is especially applicable are normally solid polymers obtained by polymerization of an olefin of the class described, under polymerization conditions, in the presence of a catalyst comprising chromium oxide associated with at least one member of the group consisting of silica, alumina, zirconia, and thoria. In order to obtain maximum catalytic activity, it is preferred that the catalyst contain a substantial proportion of its chromium in the hexavalent state. The total chromium content of the catalyst can range from about 0.1 to about 50 or more weight percent, but is ordinarily in the range from about 0.5 to 10 weight percent. The hexavalent chromium content of the catalyst is preferably at least 0.1 weight percent. A catalyst of this type can be prepared by impregnating, with an aqueous solution of a chromium compound, e.g., chromium trioxide, which is ignitable to oxide, a member of the group of additional oxides previously disclosed. A suitable oxide for this purpose is a porous silica-alumina composite of the type known in the art and utilized for the cracking of hydrocarbons. The impregnated mixture is dried and subjected to an activation treatment at a temperature in the range 450 to 1500° F., ordinarily 750 to 1200° F., for from 1 to 20 hours, under non-reducing conditions, preferably in the presence of a substantially anhydrous oxygen-containing gas, such as air having a dew point below about 0° F. (e.g. —60° F.). The polymerization process is described in more detail in the copending application of Hogan and Banks Serial No. 573,877, filed March 26, 1956, now Patent 2,825,721. Polymerization conditions include a temperature in the range 100 to 500° F. and a pressure which can range from atmospheric to 1000 p.s.i. Polymerization is ordinarily conducted in the presence of a diluent hydrocarbon which is inert and liquid under the polymerization conditions, and the pressure used is ordinarily a pressure sufficient to maintain the diluent substantially in the liquid phase. Suitable diluents are propane, the butanes, the pentanes, and other paraffinic hydrocarbons such as the octanes, as well as naphthenic hydrocarbons such as cyclohexane and cyclopentane.

The polymer treatment according to this invention is ordinarily conducted with at least one of the materials, i.e. the polymer and/or the urea and/or thiourea, in the molten state. Preferably, both the polymer and the treating agent are in the liquid state and are subjected to stirring or other agitation during the treatment. The molten state is preferred because of the increased mobility and improved efficiency of contacting of the two materials. A suitable temperature is one in the range 220 to 400° F., more frequently 250 to 300° F., although temperatures outside these ranges can be used.

The time of treatment according to the invention can range from one second to several hours and is ordinarily within the range 2 to 60 minutes and more frequently from about 3 to about 30 minutes.

As is known in the art, urea and thiourea decompose at temperatures at which they exist in the liquid state, particularly on prolonged heating. The decomposition has no deleterious effect on the process of this invention. However, in order to conserve reactants, the decomposition of the urea or thiourea can be retarded or prevented by the application of pressure during the treatment. This can be effected by the use of purely hydraulic pressure or by the use of an atmosphere of gas maintained under superatmospheric pressure in contact with the polymer and the urea or thiourea. Suitable gases are nitrogen, hydrogen, carbon dioxide, and ammonia. Since ammonia is one of the decomposition products the presence of at least some ammonia in the atmosphere under which the treatment is conducted is often desirable. Also, liquid ammonia can be present. In one modification of the invention, the polymer and the urea and/or thiourea can be initially mixed in the form of powders and subjected to elevated pressures by the type of technique used in powder metallurgy, the pressure being sufficient to effect a liquefaction or partial liquefaction of the two materials. Ordinarily, the external application of heat is preferred as a matter of convenience and for the purpose of insuring suitable rates of interaction of the two materials.

The amount of urea or thiourea utilized in the treatment according to this invention can vary over a wide range, but is ordinarily within the range 0.1:1 to 10:1, based on the weight of polymer treated.

At the end of the described period of treatment, a urea-rich phase is separated from a polymer-rich phase. The latter-mentioned phase is withdrawn and washed, either in the solid (e.g. comminuted) or the molten state. Water is a satisfactory washing agent. Washing and solidification can be effected simultaneously, the water or other wash liquid serving also as a direct coolant.

In one specific embodiment of the present invention, the polymer treated was a polyethylene obtained by polymerization of ethylene in admixture with 2,2,4-trimethylpentane (isooctane) at a temperature of approximately 280° F., a pressure of approximately 500 p.s.i., and a reaction time of approximately 4 hours in the presence of about 20- to 100-mesh chromium oxide-silica-alumina polymerization catalyst. The catalyst contained 2.5 weight percent chromium in the form of oxide, 2 weight percent of the catalyst being hexavalent chromium. The catalyst was prepared by immersing silica-alumina (9:1 weight ratio) in aqueous chromium trioxide solution (0.78 molar), decanting, drying, and heating in dry air for 5 hours at 950° F. The amount of ethylene used in the reaction mixture was approximately 5 weight percent based on the isooctane. The amount of catalyst used was approximately 0.1 weight percent based on isooctane. The reaction was effected while the catalyst was maintained in suspension, by mechanical stirring, in the reaction mixture. The product polymer, freed of catalyst (by filtration of reactor effluent at elevated temperature) and isooctane (by vaporization), had a molecular weight (24,500 times the inherent viscosity obtained by the use of a solution of 0.2 gram of the polyethylene in 50 cc. of tetralin at 130° C.) of about 40,000. The melting point of the polymer was approximately 255° F. The density was approximately 0.96 at 20° C. The crystallinity was approximately 93 percent. Approximately 1 part by weight of the polyethylene and 4 parts by weight of urea were stirred together at a temperature of 290° F. for from 5 to 10 minutes at atmospheric pressure. The polymer was removed from the molten mixture as a separate phase, was cooled to room temperature and washed with water to remove adhering urea. Small discs of the treated polymer approximately 1/16 inch thick and about 2 to 3 centimeters in diameter were formed and compared with discs of the untreated polyethylene having substantially the same dimensions. The urea-treated discs were much more resistant to breakage and were observably harder and tougher than the untreated polyethylene.

The treated polymers according to this invention can be used to form shaped articles by casting and by extrusion molding techniques. They can be formed into containers for fluids or into other articles, such as barrels for pencils and pens, which are resistant to abrasion and breakage. They can be formed into small machine parts such as cams, levers, and gears. Also, according to this invention, a case-hardening effect can be obtained by dipping a shaped polyethylene article, such as a gear, into molten urea. However, the immersion time of the article in the urea should be short (e.g. a few seconds) in order to prevent deformation of the polyethylene article. Repeated treatments, each of which is followed by cooling, can be utilized to avoid deformation and effect surface hardening.

While certain process steps, compositions, examples and structures have been disclosed for purposes of illustration, it is clear that the invention is not limited thereto. Variation and modification are possible within the scope of the disclosure and the claims. Thus while the invention has been described chiefly with respect to polyethylene obtained by polymerization in the presence of a chromium oxide catalyst, it is also applicable to other polyethylenes and other olefin polymers. However, polyethylenes of the type specifically described herein are preferred on account of their initial inherently superior properties (e.g. density at 20° C., 0.95 to 0.99; crystallinity at least 90 percent) with respect to other commercially available polyethylene polymers.

I claim:
1. A process which comprises heating a normally solid polymer of an aliphatic 1-olefin of 2 to 8 carbon atoms in contact with at least one compound selected from the group consisting of urea and thiourea where said compound is molten and thereafter recovering the polymer.

2. A process which comprises contacting a normally solid polymer of an aliphatic 1-olefin of 2 to 8 carbon atoms and having no branching nearer the double bond than the 4-position with a molten compound selected from the group consisting of urea and thiourea, for a period in the range 2 to 60 minutes and recovering a polymer having improved properties.

3. The process of claim 2 wherein the polymer is polyethylene and the compound is urea.

4. The process of claim 2 wherein the polymer is one prepared in the presence of a supported chromium oxide catalyst.

5. The process of claim 4 wherein the temperature of contacting is in the range 220 to 400° F.

6. A process which comprises contacting a normally solid polymer of ethylene, in the molten state, with urea, also in the molten state, for a period of time sufficient to alter the properties of said polyethylene and recovering treated polyethylene.

7. A process which comprises contacting a normally solid polymer of an aliphatic 1-olefin of 2 to 8 carbon atoms and no branching nearer the double bond than the 4-position and having been produced by polymerizing said 1-olefin in the presence of a supported chromium oxide containing catalyst with 0.1:1 to 10:1 weight parts of a compound selected from the group consisting of urea and thiourea per part polymer, said compound being in the molten state and at a temperature in the range 220–400° F., for a period of time in the range 2 to 60 minutes, and recovering a modified polymer.

8. The process of claim 7 wherein the polymer is polyethylene.

9. A process which comprises contacting a normally solid polymer of ethylene having a density in the range 0.950 to 0.990 and a crystallinity of at least 90 percent with 0.1:1 to 10:1 weight parts urea at a temperature in the range 250 to 300° F. for a period of time in the range 3 to 30 minutes, separating the treated polyethylene from the bulk of the urea, working the separated polyethylene to remove adhering urea, and recovering a polyethylene having increased hardness.

10. A process for surface hardening a shaped polymer of an aliphatic 1-olefin of 2 to 8 carbon atoms and having no branching nearer the double bond than the 4-position, said process comprising immersing said shaped polymer in a molten mass of urea, effecting a hardening of the surface of said article in contact with said molten urea, and withdrawing said article from contact with the molten urea before any deformation of said article has occurred.

11. The process of claim 10 wherein the polymer is a polymer prepared by polymerizing said 1-olefin in the presence of a supported chromium oxide catalyst.

References Cited in the file of this patent
UNITED STATES PATENTS 2,681,303    Anderson et al. _____ June 15, 1954

FOREIGN PATENTS 533,362    Belgium _____ May 16, 1955